United States Patent
Amuduri et al.

(10) Patent No.: US 10,593,139 B2
(45) Date of Patent: Mar. 17, 2020

(54) METHOD OF GRANTING ACCESS ON A ROUTE BASED UPON ROUTE TAKEN

(71) Applicant: Carrier Corporation, Palm Beach Gardens, FL (US)

(72) Inventors: Santhosh Amuduri, Telangana (IN); Ramesh Lingala, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/130,051

(22) Filed: Sep. 13, 2018

(65) Prior Publication Data
US 2019/0362572 A1 Nov. 28, 2019

(30) Foreign Application Priority Data
May 28, 2018 (IN) .............................. 201811019962

(51) Int. Cl.
*G06K 5/00* (2006.01)
*G07C 9/00* (2020.01)
(Continued)

(52) U.S. Cl.
CPC ...... *G07C 9/00111* (2013.01); *G06K 9/00624* (2013.01); *G06T 7/292* (2017.01); *G07C 9/00087* (2013.01); *G07C 2209/63* (2013.01)

(58) Field of Classification Search
CPC ............ G01C 21/3484; G01C 21/3492; G01C 21/3415; G01C 21/3423; G01C 21/3676;
(Continued)

(56) References Cited

U.S. PATENT DOCUMENTS 7,149,625 B2   12/2006   Mathews et al.
7,221,928 B2    5/2007   Laird et al.
(Continued)

FOREIGN PATENT DOCUMENTS

CN    101619983 A    1/2010
CN    106780232 A    5/2017
(Continued)

OTHER PUBLICATIONS

Notification of Transmittal of the International Search Report for International Application No. PCT/US2019/027824; dated Jul. 10, 2019; Report Received Date: Jul. 12, 2019; 6 pages.
(Continued)

*Primary Examiner* — Thien M Le
(74) *Attorney, Agent, or Firm* — Cantor Colburn LLP (57) ABSTRACT

A method of determining access in an access control system is provided. The method including: obtaining a source of an individual; obtaining a destination of the individual; determining a path for the individual from the source to the destination; tracking a location of the individual between the source and the destination; determining whether the individual has varied from the path determined in response to the location of the individual; detecting an access request to a specific access control; and deciding whether to actuate the specific access control in response to whether the individual followed the path determined.

20 Claims, 3 Drawing Sheets

(51) Int. Cl.
*G06T 7/292* (2017.01)
*G06K 9/00* (2006.01)

(58) Field of Classification Search
CPC .. G01C 21/206; G01C 21/28; G01C 21/3407; G01C 21/3438; G01C 21/3453; G01C 21/3626; G01C 21/3667; G01C 21/3679; G01C 21/3691; G01C 21/3697; G06Q 10/063114; G06Q 50/30; G06Q 10/047; G06Q 10/06; G06Q 10/063118; G06Q 10/06315; G06Q 10/08; G06Q 10/083; G06Q 10/109; G06Q 30/0261; G06Q 30/0283; G06Q 30/04; G06Q 30/0611; G06Q 30/0635

See application file for complete search history.

(56) References Cited

U.S. PATENT DOCUMENTS

| | | |
|---|---|---|
| 7,821,986 B2 | 10/2010 | Thomson et al. |
| 8,117,041 B1 | 2/2012 | Khan et al. |
| 8,126,424 B2 | 2/2012 | Piett et al. |
| 8,315,792 B2 | 11/2012 | Speier et al. |
| 8,509,803 B2 | 8/2013 | Gracieux |
| 2006/0116816 A1 | 6/2006 | Chao et al. |
| 2011/0148633 A1 | 6/2011 | Kohlenberg et al. |
| 2011/0191021 A1 | 8/2011 | Jeong et al. |
| 2013/0329047 A1 | 12/2013 | Jankowski et al. |
| 2014/0094997 A1* | 4/2014 | Hyde ................ G05D 1/0246 701/2 |
| 2015/0228136 A1 | 8/2015 | Chao et al. |
| 2016/0123747 A1 | 5/2016 | Takeuchi |
| 2016/0247113 A1* | 8/2016 | Rademaker .... G06Q 10/063114 |
| 2016/0286624 A1 | 9/2016 | Patel et al. |
| 2017/0270722 A1 | 9/2017 | Tse et al. |
| 2017/0286884 A1* | 10/2017 | Shoval ............ G06Q 10/06315 |
| 2017/0287242 A1 | 10/2017 | Meganathan |
| 2017/0364968 A1* | 12/2017 | Gopalakrishnan .......................... G06Q 30/0283 |
| 2017/0370735 A1 | 12/2017 | Salowitz |
| 2018/0051997 A1* | 2/2018 | Grochocki, Jr. ... G01C 21/3415 |
| 2018/0094943 A1* | 4/2018 | Grochocki, Jr. ... G01C 21/3492 |
| 2018/0137707 A1 | 5/2018 | Padgett et al. |
| 2018/0211724 A1* | 7/2018 | Wang .................... G16H 40/20 |
| 2019/0057340 A1* | 2/2019 | Wang ............... G06Q 10/06311 |
| 2019/0120654 A1* | 4/2019 | Todasco ............ G01C 21/3697 |
| 2019/0137288 A1* | 5/2019 | Rahematpura ..... G01C 21/3407 |

FOREIGN PATENT DOCUMENTS

| | | |
|---|---|---|
| EP | 3471066 A1 | 4/2019 |
| WO | 2017215180 A1 | 12/2017 |

OTHER PUBLICATIONS

Written Opinion of the International Searching Authority for International Application No. PCT/US2019/027824; dated Jul. 10, 2019; Report Received Date: Jul. 12, 2019; 11 pages.

* cited by examiner

METHOD OF GRANTING ACCESS ON A ROUTE BASED UPON ROUTE TAKEN

CROSS-REFERENCE TO RELATED APPLICATIONS

This application claims the benefit of Provisional Indian Application No. 201811019962 filed May 28, 2018, which is incorporated herein by reference in its entirety.

BACKGROUND

The subject matter disclosed herein generally relates to the field of access control systems, and more particularly to an apparatus and method for operating access control systems.

Existing access controls may allow an individual to unlock rooms via a key card and/or mobile device if the individual is authorized to access the room however existing access controls cannot control a path an individual takes to the access control.

BRIEF SUMMARY

According to one embodiment, a method of determining access in an access control system is provided. The method including: obtaining a source of an individual; obtaining a destination of the individual; determining a path for the individual from the source to the destination; tracking a location of the individual between the source and the destination; determining whether the individual has varied from the path determined in response to the location of the individual; detecting an access request to a specific access control; and deciding whether to actuate the specific access control in response to whether the individual followed the path determined.

In addition to one or more of the features described above, or as an alternative, further embodiments may include that the specific access control is an access control at the destination of the individual.

In addition to one or more of the features described above, or as an alternative, further embodiments may include: commanding the specific access control to not actuate in response to a credential of the individual if the individual has varied from the path.

In addition to one or more of the features described above, or as an alternative, further embodiments may include: commanding the specific access control to actuate in response to a credential of the individual if the individual has not varied from the path.

In addition to one or more of the features described above, or as an alternative, further embodiments may include that tracking a location of the individual between the source and the destination further includes: detecting a previous access request to a previous access control, the previous access request occurring prior to the access request to the specific access control.

In addition to one or more of the features described above, or as an alternative, further embodiments may include that deciding whether to actuate the specific access control in response to whether the individual followed the path determined further includes: determining that the previous access control is on the path; and commanding the specific access control to actuate in response to a credential of the individual.

In addition to one or more of the features described above, or as an alternative, further embodiments may include that deciding whether to actuate the specific access control in response to whether the individual followed the path determined further includes: determining that the previous access control is not on the path; and commanding the access control to not actuate in response to a credential of the individual.

In addition to one or more of the features described above, or as an alternative, further embodiments may include that deciding whether to actuate the specific access control in response to whether the individual followed the path determined further includes: determining that the previous access control is on the path and no other access control is located on the path between the previous access control and the specific access control; and commanding the specific access control to actuate in response to a credential of the individual.

In addition to one or more of the features described above, or as an alternative, further embodiments may include that deciding whether to actuate the specific access control in response to whether the individual followed the path determined further includes: determining that the previous access control is on the path and another access control is located on the path between the previous access control and the specific access control; and commanding the access control to not actuate in response to a credential of the individual.

In addition to one or more of the features described above, or as an alternative, further embodiments may include that deciding whether to actuate the specific access control in response to whether the individual followed the path determined further includes: determining that the previous access control is on the path and no other access control is located on the path between the previous access control and the specific access control; detecting a period of time between the previous access request to the previous access control and the access request to a specific access control; and commanding the specific access control to actuate in response to a credential of the individual when the period of time is less than a selected period of time.

In addition to one or more of the features described above, or as an alternative, further embodiments may include that deciding whether to actuate the specific access control in response to whether the individual followed the path determined further includes: determining that the previous access control is on the path and no other access control is located on the path between the previous access control and the specific access control; detecting a period of time between the previous access request to the previous access control and the access request to a specific access control; and commanding the access control to not actuate in response to a credential of the individual when the period of time is greater than a selected period of time.

In addition to one or more of the features described above, or as an alternative, further embodiments may include that tracking a location of the individual between the source and the destination further includes: tracking a location of a mobile device being carried by the individual.

In addition to one or more of the features described above, or as an alternative, further embodiments may include that tracking a location of a mobile device being carried by the individual further includes: detecting a wireless signal emitted from a mobile device being carried by the individual using one or more access controls; determining a signal strength of the wireless signal emitted from the mobile device between the mobile device and each of the one or more access controls; and determining the position of the mobile device in response to the signal strength determined between the mobile device and each of the one or more access controls.

In addition to one or more of the features described above, or as an alternative, further embodiments may include that tracking a location of a mobile device being carried by the individual further includes: detecting a wireless signal emitted from a mobile device being carried by the individual using one or more wireless access protocol devices; determining a signal strength of the wireless signal emitted from the mobile device between the mobile device and each of the one or more wireless access protocol devices; and determining the position of the mobile device in response to the signal strength determined between the mobile device and each of the one or more wireless access protocol devices.

In addition to one or more of the features described above, or as an alternative, further embodiments may include that tracking a location of a mobile device being carried by the individual further includes: detecting a wireless signal emitted from one or more wireless access protocol devices using a mobile device being carried by the individual using; determining a signal strength of the wireless signal emitted from the one or more wireless access protocol devices between the mobile device and each of the one or more wireless access protocol devices; and determining the position of the mobile device in response to the signal strength determined between the mobile device and each of the one or more wireless access protocol devices.

In addition to one or more of the features described above, or as an alternative, further embodiments may include: conveying the path to the individual via at least one of a mobile device of the individual and a display screen.

In addition to one or more of the features described above, or as an alternative, further embodiments may include: activating an alert if the individual has varied from the path.

In addition to one or more of the features described above, or as an alternative, further embodiments may include that tracking a location of the individual between the source and the destination further includes: detecting a location of an individual proximate a previous access control on the path prior to the specific access control; detecting that no access request was transmitted to the previous access control; and commanding the specific access control to actuate in response to a credential of the individual.

In addition to one or more of the features described above, or as an alternative, further embodiments may include that tracking a location of the individual between the source and the destination further includes: detecting a location of an individual proximate a previous access control on the path prior to the specific access control; detecting that no access request was transmitted to the previous access control; and commanding the specific access control to not actuate in response to a credential of the individual.

According to another embodiment, a computer program product tangibly embodied on a computer readable medium is provided. The computer program product including instructions that, when executed by a processor, cause the processor to perform operations including: obtaining a source of an individual; obtaining a destination of the individual; determining a path for the individual from the source to the destination; tracking a location of the individual between the source and the destination; determining whether the individual has varied from the path determined in response to the location of the individual; detecting an access request to a specific access control; and deciding whether to actuate the specific access control in response to whether the individual followed the path determined.

Technical effects of embodiments of the present disclosure include determining a path for an individual between a source and a destination then conditioning access to an access control at the destination based upon the adherence of the individual to the determined path.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
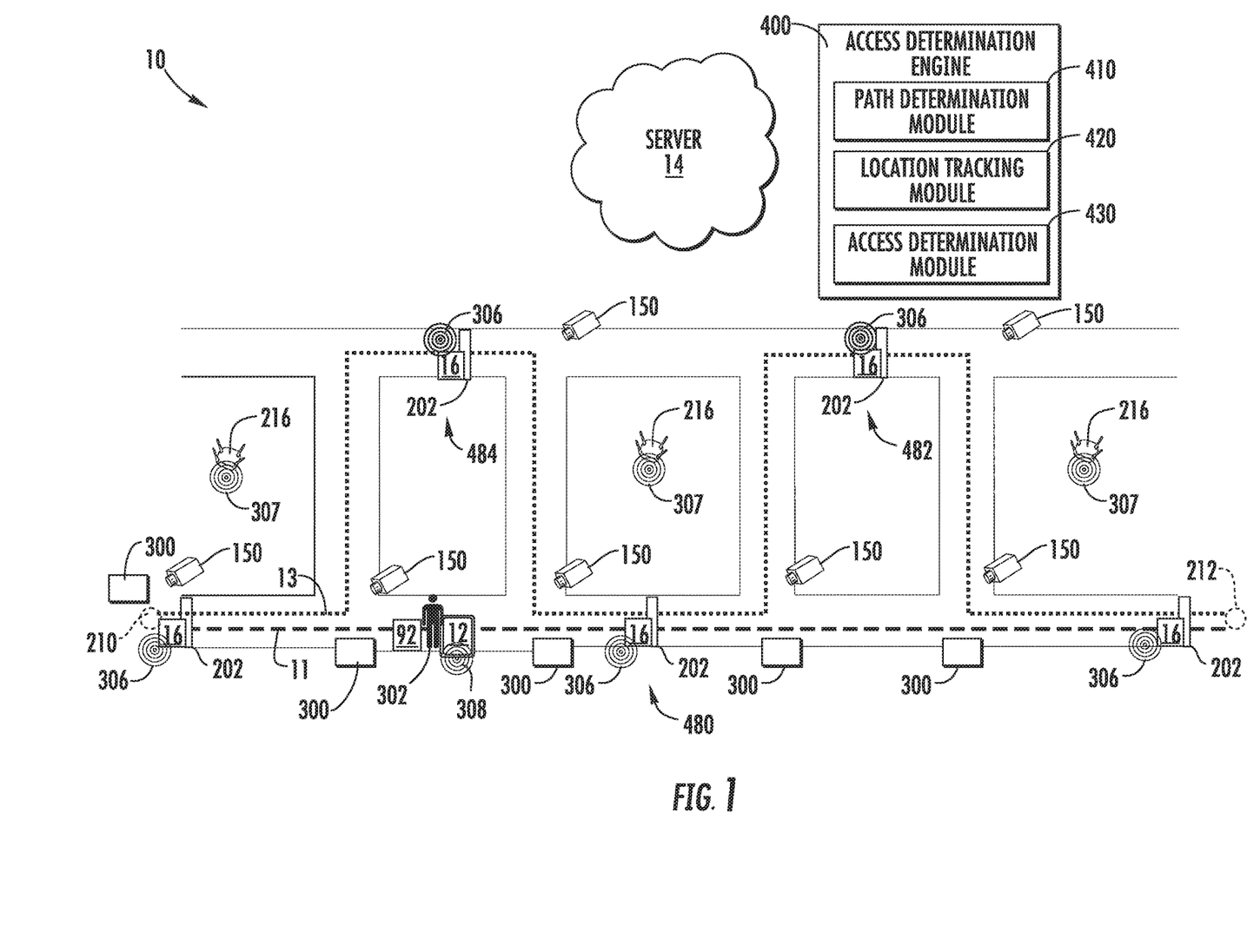
FIG. 1 illustrates a general schematic system diagram of an access control system, in accordance with an embodiment of the disclosure.

FIG. 1 schematically illustrates an access control system 10. The system 10 generally may include a mobile device 12, a key card 92, a server 14, a wireless access protocol device 216, a remote display 300, and an access control 16. The access control system 10 may include any number of mobile devices 12, key cards 92, servers 14, wireless access protocol devices 216, and access controls 16. It should be appreciated that, although particular systems are separately defined in the schematic block diagrams, each or any of the systems may be otherwise combined or separated via hardware and/or software. In the illustrated embodiment, the access controls 16 may control access through/past an impediment 202. For instance, the impediment 202 may be a door, a turnstile, a gate, a garage, or any known impediment known to one of skill in the art. The access control system 10 may include any number of impediments 202. In an example, the access control 16 may be a door lock on a door and thus the door is the impediment 202.

A physical key card 92 or mobile device 12 belonging to an individual 302 may be granted access to one or more access controls 16 (e.g. the door lock on an office or hotel room assigned to the individual) that control access to an impediment 202. In one example, when an individual 302 begins working at a new building their mobile device 12 or key card 92 will be granted access controls 16 operably connected to impediments 202 of rooms/buildings where they are allowed to enter and/or work. In another example, when an individual 302 checks into the hotel room their mobile device 12 or key card 92 will be granted access to an access control 16 that locks the room. There may be one or more key cards 92 or mobile devices 12 authorized to actuate an access control 16 (e.g. a husband and a wife in a hotel; multiple workers in a collaborative workspace; multiple students in a school).

An individual 302 may utilize their key card 92 to unlock and/or lock an access control 16 by inserting the key card 92 into the access control 16, placing the key card 92 proximate the access control 16, or swiping the key card 92 through the access control 16. An individual 302 may utilize their mobile device 12 to unlock and/or lock the access control 16 operably connected to their assigned room through an access request. The mobile device 12 may store credentials to unlock and/or lock the access control 16. Some credentials may be used for multiple access controls 16. For example, an access control 16 operably connected to a hotel room of the individual 302 and an access control 16 operably connected to a hotel pool may respond to the same credential of the individual 302. Other credentials may be specific to a single access control 16.

The mobile device 12 is a wireless capable handheld device such as a smartphone that is operable to communicate with the server 14 and the access controls 16. Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may transmit an access request to the access control 16 by short-range radio transmission when the mobile device 12 is placed proximate the access control 16. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16. Wireless communication may occur between the mobile device 12 and the access control 16 via RFID any other short-range wireless communication method known to one of skill in the art.

Each access control 16 is a wireless-capable, restricted-access, or restricted-use device such as wireless locks, access control readers for building entry, and other restricted-use machines. The mobile device 12 or key card 92 submits credentials to the access controls 16, thereby selectively permitting an individual 302 to actuate (i.e., access or activate) functions of the access controls 16. An individual may, for example, submit a credential to an electromechanical lock to unlock it, and thereby gain access to a room or area past the impediment 202. In another embodiment, the access control 16 may be composed of a reader and the reader passes the credential read from the key card 92 or mobile device 12 to a controller that then commands an impediment 202 to be opened. The controller may be the server 14 or located on the server 14. In yet another embodiment, the mobile device 12 communicates to the server 14 the credential, which then communicates to the access control 16 to indicate the credential or a command to unlock the access control 16. In any case, the mobile device 12 and/or key card 92 can be used to actuate the access control 16.

The server 14 may be local and/or cloud based. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through the mobile device 12.

The system 10 may include an access determination engine 400 configured to determine determining a path 11 for an individual 302 between a source 210 and a destination 212 and then condition access to an access control 16 at the destination 212 based upon the adherence of the individual 302 to the determined path 11. The access determination engine 400 is comprised of modules 410, 420, 430 including a path determination module 410; a location tracking module 420; and an access determination module 430. Each module 410, 420, 430 may be located on either the mobile device 12 or the server 14. Alternatively, the modules 410, 420, 430 may be distributed between the mobile device 12 and the server 14.

The path determination module 410 is configured to determine a path 11 for an individual 302 between the source 210 and the destination 212. The path 11 determined by the path determination module 410 may be determined to avoid locations where the individual 302 may not be authorized to enter at a particular moment in time. The source 210 may be a starting place for an individual 302. For example, the source 210 may be the parking lot of a student first arriving on campus or the lobby of an office building for an employee arriving to work. The destination 212 may be the final destination of the individual 302. For example, the destination may be a classroom of a student on campus or the desk of an employee within an office building.

The source 210 may be entered manually be the individual 302 into an application on the mobile device 12 and/or may be determined with the help of the location determination module 420, discussed further below. The destination 212 may be entered manually be the individual 302 into an application on the mobile device 12 and/or may be automatically determined. The destination 212 may be automatically determined based upon a schedule of an individual 302, by a known location of the individual 302 (e.g., such as an 'office' of the individual 302), by an appointment of the individual 302 (e.g., such as in a conference room or class room or the like), based upon a request of someone else as assigned to the individual 302, based upon a job ticket assigned to the individual 302, based upon a location of equipment the individual 302 is authorized to service, based upon an emergency situation that provides the individual 302 temporary access rights to reach a particular destination, etc.

The path 11 may be conveyed to the individual 302 via the mobile device 12. For example, the individual may be able to view the path 11 on a map through an application on the mobile device 12. If the individual does not have a mobile device 12 the path 11 may be conveyed to the individual 302 via one or more remote displays 300 positioned along the path 11. The remote display 300 may be a computer monitor, projection, hologram, or television screen. In an example, the individual 302 may approach the remote display 300 and view the path 11 or the next place to go. The remote display 300 may display the entire path or just an arrow point in the correct direction. The individual 302 may need to swipe their key card 92 to view the remote display 300 or the location of the individual 302 may be automatically detected at a specific display utilizing visual recognition using a camera 150 and/or proximity detection of the key card 92, as discussed above.

The location determination module 420 is configured to determine a location of the individual 302 from the source 210 to the destination 212. The location of the individual 302 may be determined by the timing of an access request at an access control 16 and calculated walking time from the access control 16. The location of the individual 302 may also be automatically detected by a camera 150 identifying the individual 302 through facial visual recognition. The location of the individual 302 may be automatically determined by a location of the mobile device 12 being carried by the individual 302. The location of the mobile device 12 may be determined through GPS or other wireless signal detection using at least one of the mobile device 12, the access controls 16, and the wireless access protocol devices 216. The wireless signal detection may include detecting the signal strength of the wireless signal at different locations and triangulating the location based upon the signal strength.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine a location of the mobile device 12 in response to a signal strength of the wireless signal 306.

The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a location of the mobile device 12 in response to a signal strength of the wireless signal 307.

The location of the mobile device 12 may also be determined using the wireless access protocol device 216 and/or the access controls 16 to detect a signal advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a location data of the mobile device 12 in response to a signal strength of the wireless signal 308. The location of the mobile device 16 may be triangulated by relaying up to the location determination module 420 the strength of each wireless signal 308 detected and then the location determination module 420 can triangulate the position.

Wireless signal interaction data between the mobile device 12 and at least one of the access device 16 and the wireless access protocol device 216 may transmitted to the server 14 to determine a location of the mobile device 12. In an embodiment, the location determination module 420 may be located on the server 14 and may be used to determine a location of the mobile device 12. The server 14 may use signal strength detected between the mobile device 12, access controls 16, and the wireless access protocol device 216 to determine a location of the mobile device 12.

The location determination module 420 module is configured to track the location of the individual 302 as the individual 302 is moving from the source 210 to the destination 212. The location determination module 420 may determine that the individual 302 has followed the path 11 originally determined by the path determination module 410 or that the individual 302 has followed an alternate path 13 as shown in FIG. 1 (i.e., varied from the path 11), which is then passed onto the access determination module 430.

The access determination module 430 may determine whether or not to allow the individual 302 to actuate the access control 16 at the destination 202 in response to whether or not the individual followed the determined path 11. The access determination module 430 may have a policy where the individual 302 is allowed to deviate up to a selected distance of the path 11 or deviate off the path 11 for a selected amount of time. Additionally, there may be factors that override the policy including emergency evacuations—fire, flood, etc. Further, the access determination module 430 may include providing notification to an approval authority that indicates a deviation and then may re-route them if the approval authority determines the individual 302 can reach the destination 212 through another path. If the individual 302 varies from the path, then individual 302 can be directed back to the original path 11 and other access controls 16 (e.g., such as the access controls 16 at locations 482, 484) off the path 11 may remain locked and not open because the individual 302 has deviated from the determined path 11.

The access determination module 430 may utilize the location of the individual to determine whether the individual 302 has varied from the path 11. The access determination module 430 may also utilize access requests received from various access controls to determine if the individual 302 has varied from the path 11. An access request to an access control 16 not on the determined path 11 is an indication that the individual may have varied off the path 11. For example, in order to access the access control 16 located at location 480, in FIG. 1, it may be required that the last access control 16 accessed by the individual 302 be the access control 16 at the source 210, which is the access control 16 immediately prior to the access control 16 located at location 480 along the path 11. In another example, in order to access the access control 16 located at the destination 212 on FIG. 1, it may be required that the last access control 16 accessed by the individual 302 be the access control 16 at location 480, in FIG. 1, which is the access control 16 immediately prior to the access control 16 located at the destination 212 along the path 11. In another example, access may be denied to the access control 16 located at the destination 212 if it is determined that the individual attempted to access an access control 16 located at location 482, in FIG. 1, and was denied access immediately prior to attempting to access the access control 16 located at the final destination 212, because the access control 16 located at location 482 is not on the path 11 determined but rather on an alternate path 13. Advantageously, by conditioning access to a specific access control 16 be based upon the most recent access request being to an immediately prior access control 16 along the path 11 then the individual is forced to follow the path and not skip any access controls 16.

Also advantageously, by determining a path 11 for the individual 302 to follow to a destination 212 and conditioning entry at the destination 212 based upon adherence to the path 11, the individual is required to follow the path 11 otherwise risk not being allowed access to the access control 16 located at the destination 212. The access determination module 430 may also be in continuous communication with the location tracking module 420 to activate an alarm in real time if the individual either veers of the path determined by the path determination module 410 or loiters too long in between consecutive access controls 16. Also advantageously, by determining a path 11 for the individual 302 to follow to a destination 212 and conditioning entry at the destination 212 based upon adherence to the path 11, access controls 16 located off the determined path 11 may deny access to the individual 302, thus requiring the individual 302 to follow the path 11.

Figure 2:
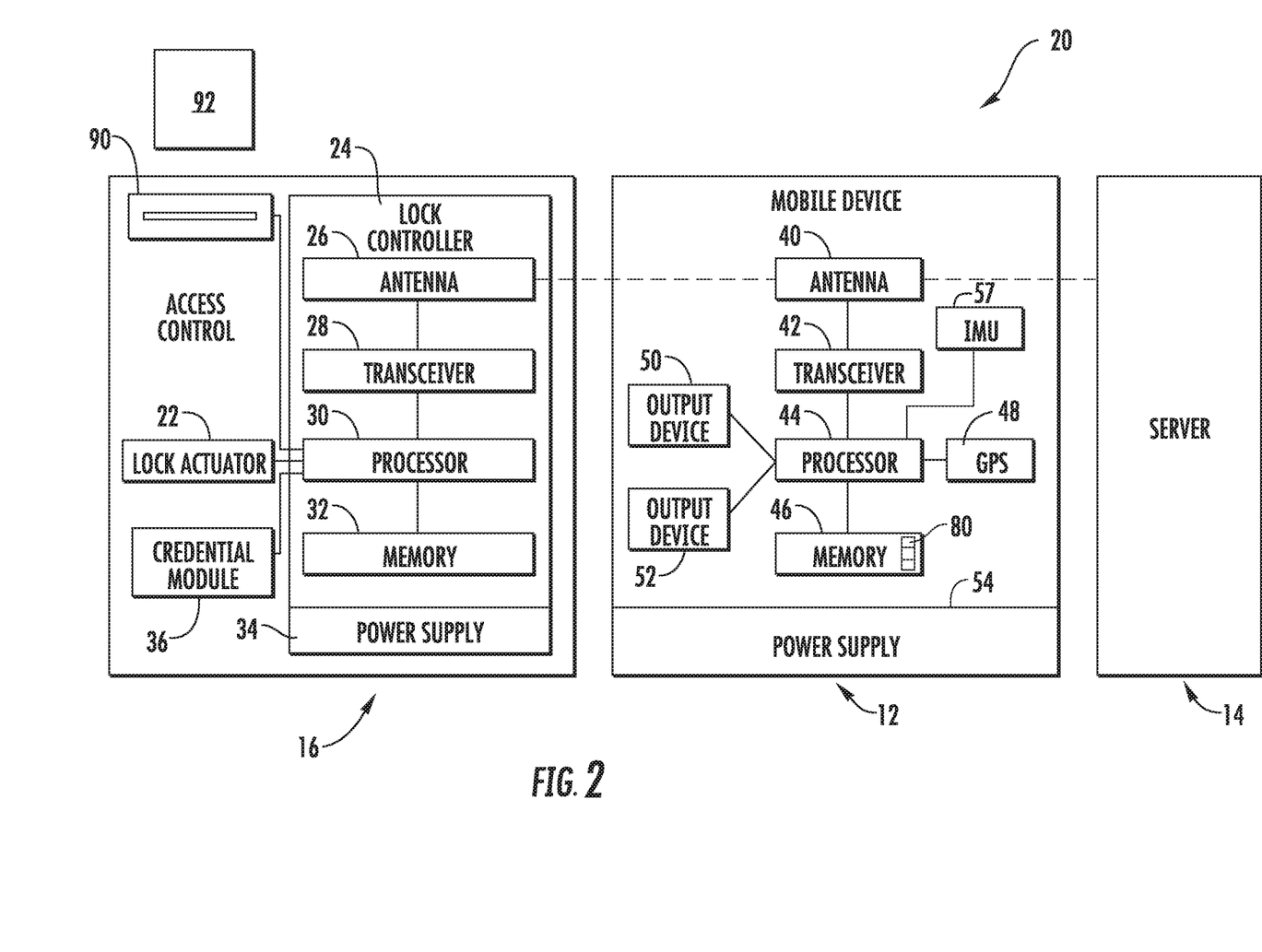
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, key card 92, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components, such as, for example, a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an inertial measurement unit (IMU) sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
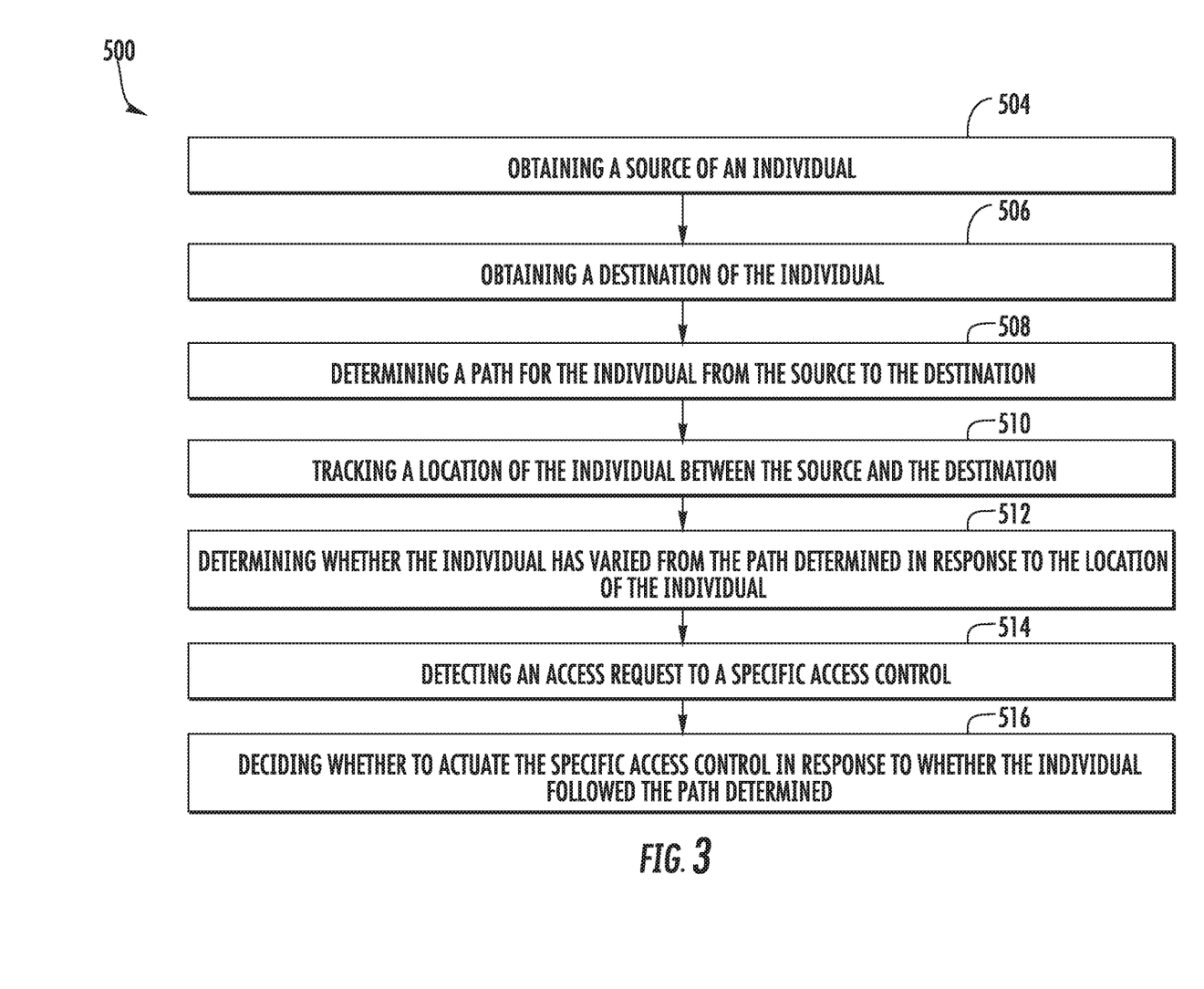
FIG. 3 is a flow diagram illustrating a method of determining a destination of an individual carrying a mobile device, according to an embodiment of the present disclosure.

Referring now to FIG. 3 with continued reference to FIGS. 1-2. FIG. 3 shows a flow chart of method 500 of determining access in an access control system 10. The method 500 may be performed by the mobile device 12 and/or the server 14. At block 504, a source 210 of an individual 302 is obtained. In a few non-limiting examples, the source 210 may be a building entrance, a door from an entrance lobby, a door leading out from the current location of the individual (even if they are inside a building it may be a door from the room they are occupying towards a destination), etc. At block 506, a destination 212 of the individual 302 is obtained. The destination 212 may be determined manually or automatically, as discussed above. At block 508, a path 11 for the individual 302 from the source 210 to a destination 212 is determined. The path 11 may be expressed as a dotted line along a floor plan of a building that bisects certain access controls 16 and the individual 302 is granted access to each access control 16 as they move along the path 16. The path 11 may also be expressed as the sequence of access controls 16 that the individual 302 will need to actuate in order to reach the destination 212. The path 11 may be conveyed to the individual 302 via the mobile device 12. For example, the individual may be able to view the path 11 on a map through an application on the mobile device 12.

If the individual does not have a mobile device 12 the path 11 may be conveyed to the individual 302 via one or more remote displays 300 positioned along the path 11. The remote display 300 may be a computer monitor, projection, hologram, or television screen. In an example, the individual 302 may approach the remote display 300 and view the path 11 or the next place to go. The remote display 300 may display the entire path or just an arrow point in the correct direction. The individual 302 may need to swipe their key card 92 to view the remote display 300 or the location of the individual 302 may be automatically detected at a specific display utilizing visual recognition using a camera 150 and/or proximity detection of the key card 92, as discussed above.

At block 510, a location of the individual 302 between the source 210 and the destination 212 is tracked. The tracking may be continuous and/or intermittent, as discussed above. For example an individual 302 may be continuously tracked utilizing GPS, facial image recognition using cameras, wireless signal strength detection between a mobile device 12 being carried by the individual 302 and one or more access controls 16, and wireless signal strength detection between a mobile device 12 being carried by the individual 302 and one or more wireless access protocol devices 216. An individual 302 may be intermittently tracked by tracking access requests to access controls 16. For example, an individual 16 may need to pass through multiple impediments associated with access controls 16 along the path 11, thus the location of the individual 302 along the path 11 may be associated with the most recent access control 16 the individual accessed. Further, a location of the individual 302 along the path 11 may be calculated by using an estimated walking speed and the most recent access control 16 the individual 302 accessed.

At block 512, it is determined whether the individual 302 has varied from the path 11 determined in response to the location of the individual 302. It may be detected that an individual 302 has varied from the path 11 by the location of the individual 302 being actively tracked in real time or by access controls 16 where the individual 302 has attempted to access. For example, if it is detected that the individual 302 has attempted to access an access control 16 not on the path 11 (i.e., by detecting an access request) then it may be determined that the individual 302 has varied from path 11. An alert may be activated on a mobile device 12 of the individual 302 if the individual has varied from the path. The alert may be activated instantaneously if the mobile device 12 is continuously tracking the location of the individual 302 along the path 11 or the mobile device is continuously connected to the server 14, otherwise the alert may be activated when the mobile device 12 comes within communication range of an access control 16. Additionally, there may be several different kinds of alerts provided either on the mobile device 12, the remote displays 300, another individuals' mobile device, a computer, an email system, a building siren/alert, an audio feedback in the area where the individual 302 is located, etc. The alert may serve multiple purposes, such as, for example, an alert to the individual 302 to guide them back to the correct path 11, an alert to the individual 302 to warn them of consequences to diverting from the path 11, an alert to an authority (i.e. security) that the individual 302 has veered from the path 11, an alert to other occupants of a building, an alert to warn the individual 302 that the individual 302 only has a selected amount of time remaining to reach the next access control, etc. The access control system 10 may be linked to a fire system to make use of the already existing building annunciators to provide local feedback to the individual on where to go next. The fire system may have audio annunciation ability along with flashing lights, etc.

At block 514, an access request to a specific access control 16 is detected. The specific access control 16 may be an access control 16 located at the destination 212 or any access control 16 located along the path 11 between the source 210 and the destination 212.

At block 516, it is determined whether to actuate the specific access control 16 in response to whether the individual 302 followed the path 11 determined. The specific access control 16 may be commanded to actuate in response to a credential of the individual 302 if the individual 302 has not varied from the path 11 and may be commanded to not actuate in response to a credential of the individual 302 if the individual 302 has varied from the path 11.

As mentioned above, it may be determined that the individual 302 varied from the path 11 by detecting a previous access request to a previous access control 16 on the path 11 prior to the specific access control 16 (i.e. the previous access request occurring prior to the access request to the specific access control 16). An individual 302 may be denied access to actuate the specific access control 16 when their credential is submitted if the previous access control 16 was not on the path 11.

An individual 302 may also be denied access to actuate the specific access control 16 when their credential is submitted if the individual 302 skipped an expected access control 16 on the path. For example, in the case of tail-gating where someone else has opened the door for the individual 302 and let them through without the individual 302 badging into the access control 16. In the tail-gating example, the individual has not varied from the path but has not badged into every access control 16 along the path 11. Thus, the policy may be strict requiring the individual to badge in at each access control 16 along the path 11 to prevent tailgating or the policy may be lenient allowing tailgating as long as the individual 302 stays on the path 11. Further, a 'soft badge-in' could be used where the access control system 10 acknowledges that the individual 302 is passing through an impediment 202 near the expected access control 16, but the individual 302 did not actually actuate the access control 16.

An individual 302 may be granted access to actuate the specific access control 16 when their credential is submitted if they previous access control 16 was on the path 11. The previous access control 16 may be an access control along the path 11 or it may be further required that previous access control 16 be an access control 16 immediately prior to the specific access control 16 along the path 11 (i.e. no other access control 16 is located on the path 11 between the previous access control 16 and the specific access control 16).

Further there may be a timeout between the previous access control 16 and the specific access control 16, thus ensuring that an individual moves promptly between two access controls 16 along the path 11. Thus, actuation of the specific access control 16 may be dependent up whether there is another access control 16 between the specific access control 16 and the previous access control along the path 11 and a time between an access request to the specific access control 16 and the previous access request to the previous access control 16. For example, the method 500 may further comprise: detecting a period of time between the previous access request to the previous access control 16 and the access request to a specific access control 16; and then commanding the specific access control 16 to actuate in response to a credential of the individual 302 when the period of time is less than a selected period of time. The specific access control 16 may be commanded not to actuate in response to a credential of the individual 302 when the period of time is greater than a selected period of time.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An access control system, the access control system comprising:
    a processor; and
    a memory comprising computer-executable instructions that, when executed by the processor, cause the processor to perform operations, the operations comprising:
        obtaining a source of an individual;
        obtaining a destination of the individual;
        determining a path for the individual from the source to the destination;
        tracking a location of the individual between the source and the destination;
        determining whether the individual has varied from the path determined in response to the location of the individual;
        detecting an access request to a specific access control; and
        deciding whether to actuate the specific access control in response to whether the individual followed the path determined, the access control comprising a lock actuator to lock or unlock a mechanical or electronic lock of the access control.

2. The access control system of claim 1, wherein the specific access control is an access control at the destination of the individual.

3. The access control system of claim 1, wherein the operations further comprise:
    commanding the specific access control to not actuate in response to a credential of the individual if the individual has varied from the path.

4. The access control system of claim 1, wherein the operations further comprise:
    commanding the specific access control to actuate in response to a credential of the individual if the individual has not varied from the path.

5. The access control system of claim 1, wherein tracking a location of the individual between the source and the destination further comprises:
    detecting a previous access request to a previous access control, the previous access request occurring prior to the access request to the specific access control.

6. The access control system of claim 5, wherein deciding whether to actuate the specific access control in response to whether the individual followed the path determined further comprises:
    determining that the previous access control is on the path; and
    commanding the specific access control to actuate in response to a credential of the individual.

7. The access control system of claim 5, wherein deciding whether to actuate the specific access control in response to whether the individual followed the path determined further comprises:
    determining that the previous access control is not on the path; and
    commanding the access control to not actuate in response to a credential of the individual.

8. The access control system of claim 5, wherein deciding whether to actuate the specific access control in response to whether the individual followed the path determined further comprises:
    determining that the previous access control is on the path and no other access control is located on the path between the previous access control and the specific access control; and
    commanding the specific access control to actuate in response to a credential of the individual.

9. The access control system of claim 5, wherein deciding whether to actuate the specific access control in response to whether the individual followed the path determined further comprises:
   determining that the previous access control is on the path and another access control is located on the path between the previous access control and the specific access control; and
   commanding the access control to not actuate in response to a credential of the individual.

10. The access control system of claim 5, wherein deciding whether to actuate the specific access control in response to whether the individual followed the path determined further comprises:
   determining that the previous access control is on the path and no other access control is located on the path between the previous access control and the specific access control;
   detecting a period of time between the previous access request to the previous access control and the access request to a specific access control; and
   commanding the specific access control to actuate in response to a credential of the individual when the period of time is less than a selected period of time.

11. The access control system of claim 5, wherein deciding whether to actuate the specific access control in response to whether the individual followed the path determined further comprises:
   determining that the previous access control is on the path and no other access control is located on the path between the previous access control and the specific access control;
   detecting a period of time between the previous access request to the previous access control and the access request to a specific access control; and
   commanding the access control to not actuate in response to a credential of the individual when the period of time is greater than a selected period of time.

12. The access control system of claim 1, wherein tracking a location of the individual between the source and the destination further comprises:
   tracking a location of a mobile device being carried by the individual.

13. The access control system of claim 12, wherein tracking a location of a mobile device being carried by the individual further comprises:
   detecting a wireless signal emitted from a mobile device being carried by the individual using one or more access controls;
   determining a signal strength of the wireless signal emitted from the mobile device between the mobile device and each of the one or more access controls; and
   determining the position of the mobile device in response to the signal strength determined between the mobile device and each of the one or more access controls.

14. The access control system of claim 12, wherein tracking a location of a mobile device being carried by the individual further comprises:
   detecting a wireless signal emitted from a mobile device being carried by the individual using one or more wireless access protocol devices;
   determining a signal strength of the wireless signal emitted from the mobile device between the mobile device and each of the one or more wireless access protocol devices; and
   determining the position of the mobile device in response to the signal strength determined between the mobile device and each of the one or more wireless access protocol devices.

15. The access control system of claim 12, wherein tracking a location of a mobile device being carried by the individual further comprises:
   detecting a wireless signal emitted from one or more wireless access protocol devices using a mobile device being carried by the individual using;
   determining a signal strength of the wireless signal emitted from the one or more wireless access protocol devices between the mobile device and each of the one or more wireless access protocol devices; and
   determining the position of the mobile device in response to the signal strength determined between the mobile device and each of the one or more wireless access protocol devices.

16. The access control system of claim 1, wherein the operations further comprise:
   conveying the path to the individual via at least one of a mobile device of the individual and a display screen.

17. The access control system of claim 1, wherein the operations further comprise:
   activating an alert if the individual has varied from the path.

18. The access control system of claim 1, wherein tracking a location of the individual between the source and the destination further comprises:
   detecting a location of an individual proximate a previous access control on the path prior to the specific access control;
   detecting that no access request was transmitted to the previous access control; and
   commanding the specific access control to actuate in response to a credential of the individual.

19. The access control system of claim 1, wherein tracking a location of the individual between the source and the destination further comprises:
   detecting a location of an individual proximate a previous access control on the path prior to the specific access control;
   detecting that no access request was transmitted to the previous access control; and
   commanding the specific access control to not actuate in response to a credential of the individual.

20. A computer program product tangibly embodied on a computer readable medium, the computer program product including instructions that, when executed by a processor, cause the processor to perform operations comprising:
   obtaining a source of an individual;
   obtaining a destination of the individual;
   determining a path for the individual from the source to the destination;
   tracking a location of the individual between the source and the destination;
   determining whether the individual has varied from the path determined in response to the location of the individual;
   detecting an access request to a specific access control; and
   deciding whether to actuate the specific access control in response to whether the individual followed the path determined, the access control comprising a lock actuator to lock or unlock a mechanical or electronic lock of the access control.

* * * * *